March 9, 1954 A. A. MEDDOCK 2,671,433
PRESSURE FLOW CONTROLLED SELF-HOLDING SELECTOR VALVE
Filed Dec. 15, 1952
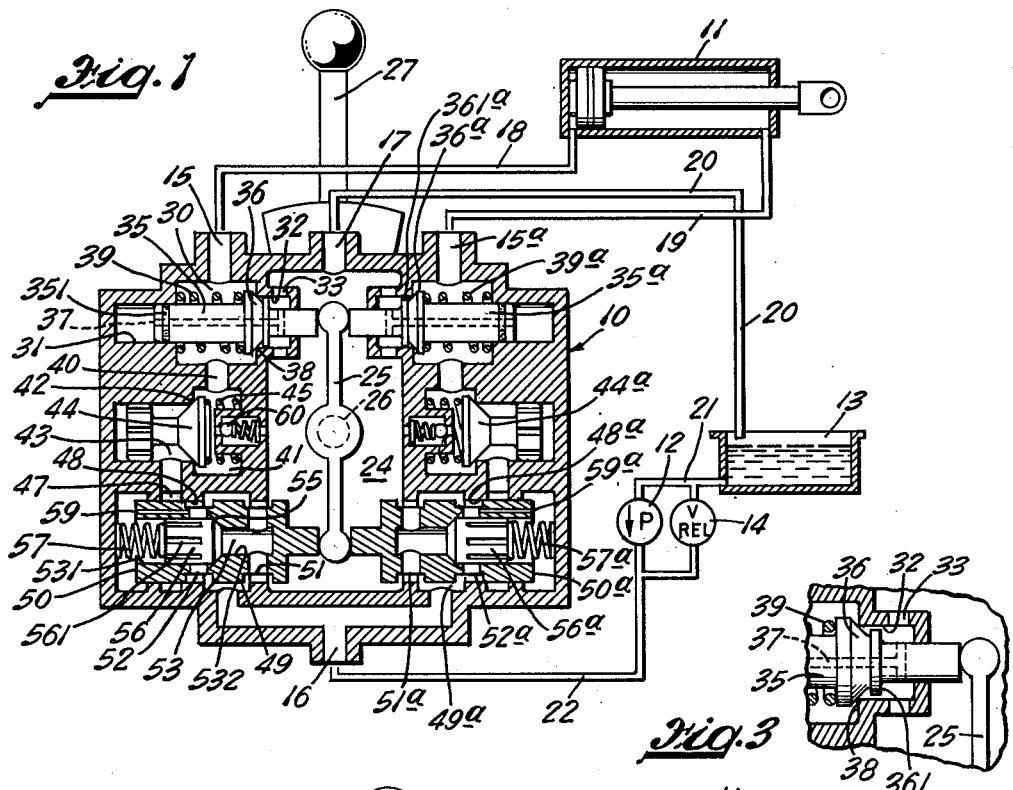
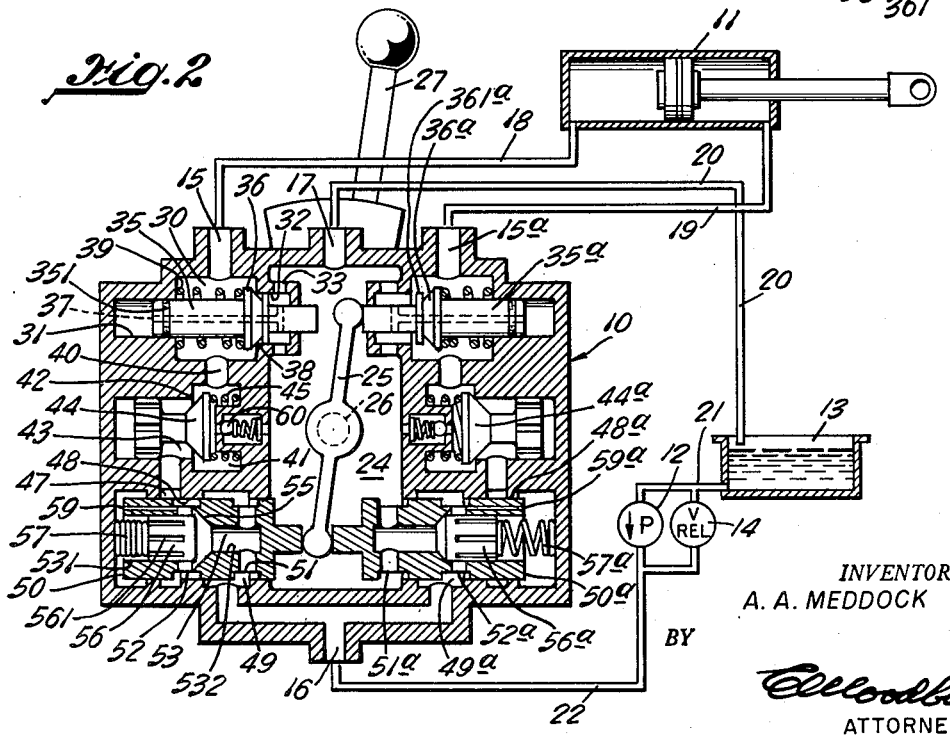
INVENTOR.
A. A. MEDDOCK
BY
ATTORNEY Patented Mar. 9, 1954

2,671,433

UNITED STATES PATENT OFFICE 2,671,433

PRESSURE FLOW CONTROLLED SELF-HOLDING SELECTOR VALVE

Alvin A. Meddock, Van Nuys, Calif., assignor to Bendix Aviation Corporation, North Hollywood, Calif., a corporation of Delaware Application December 15, 1952, Serial No. 325,980

9 Claims. (Cl. 121—46.5)

This invention relates to selector valves for controlling hydraulic motors and more particularly to valves which hold in actuating position until the motor movement is completed and then automatically restore to neutral position.

An object of the invention is to provide a simple and practicable self-holding automatic restore selector valve.

Another object is to provide a practicable self-holding automatic restore selector valve having positive locking of the motor lines in neutral position.

Other more specific objects and features of the invention will appear from the description to follow.

It is old to hold a selector valve open with a detent that is disabled or overcome by rise in pressure in the inlet line at completion of the cylinder stroke. It is also old to hold a valve open by a pressure drop in the return flow line in the valve, which pressure drop disappears when the cylinder has completed its stroke and the return flow stops.

The present invention differs from these prior known methods in that flow in the pressure passages of the valve is utilized to produce a pressure drop that holds the valve in open position until the flow ceases. This is accomplished by applying the full pressure in the inlet passage to one end of the valve and applying a reduced pressure to the other end of the valve by means of a pressure-reducing valve in the passage through which fluid must flow to the motor. The resultant pressure differential between the opposite ends of the valve holds it in open position until the motor reaches the end of its stroke and stops, the flow through the pressure-reducing valve, whereupon the pressures equalize on opposite ends of the valve and it is restored to neutral position by the usual centering spring.

Further in accordance with the invention there is provided a construction such that the same springs that cause the centering of the valve also function to control the pressure reducing valve.

A complete understanding of the invention can be had from the following detailed description with reference to the drawing, in which:

Fig. 1 is a schematic diagram showing a hydraulic system incorporating a valve in accordance with the invention, the valve being shown in neutral position;

Fig. 2 is a view similar to Fig. 1 but showing the valve in one actuated position; and Fig. 3 is an enlarged view of a portion of the structure of Fig. 1.

Referring to Fig. 1 the system therein disclosed comprises as its essential elements a selector valve 10 in accordance with the present invention, a motor cylinder 11, a pump 12, a reservoir 13, and a pressure relief valve 14. The valve 10 has a pair of motor passages 15 and 15a, a pressure passage 16 and a return passage 17. The motor passages 15 and 15a are connected by lines 18 and 19 respectively to opposite ends of the motor cylinder 11. The return passage 17 is connected by a line 20 to the reservoir 13. The reservoir is also connected by a line 21 to the inlet of the pump 12, and the outlet of the pump is connected by a line 22 to the pressure inlet passage 16 of the valve 10.

Referring now to the valve 10, the return passage 17 communicates with a chamber 24 within the valve which chamber contains an actuating arm 25 mounted on a shaft 26 which extends to the exterior of the valve and is connected to a handle 27 which constitutes a control member. This control member is movable in either direction from a neutral position, as shown in Fig. 1, into either of two open positions, one of which is shown in Fig. 2.

There are two sets of valve elements and passages in the valve 10, one associated with the motor passage 15 and the other associated with the motor passage 15a. Since the two sets are identical those associated with the motor passage 15 are identified by numerals and the corresponding parts associated with the motor passage 15a are identified by the same numeral with the suffix "a."

The motor passage 15 communicates with a chamber 30 which has a cylinder 31 extending from its left end and has a cylindrical passage 32 at its right end which communicates through passages 33 with the return chamber 24. A pressure balanced check valve is provided in the chamber 30, this valve having a piston portion 35 guided in the cylinder 31 and sealed with respect thereto by a sealing ring 35l, and a poppet 36 on its right end which normally seats against the inner end of the cylindrical passage 32 to seal the motor port 15 from the chamber 24. A passage 37 extending through the piston 35 and past the poppet 36 communicates the left end of the cylinder 31 with the chamber 24 so that the same pressure is always applied to opposite ends of the return valve. Furthermore the diameter of the piston 35 is only slightly less than the diameter of the seat 38 whereby any pressure existent in the chamber 30 has only a slight closing effect on the valve, and it is normally held in closed position largely by a spring 39.

The inner end of the return valve bears against the upper end of the actuating arm 25 so that movement of the control member 27 to the left out of neutral position opens the valve.

The passage 30 is directly communicated by a passage 40 with a chamber 41 which is communicated by a valve seat 42 with a chamber 43. A check valve in the form of a poppet 44 is yieldably retained against the seat 42 by a spring 45 to prevent fluid flow from the chamber 41 to the chamber 43 while permitting reverse flow.

The chamber 43 is communicated by a port 47 with a shuttle valve cylinder 48 which has a second port 49 communicating with the inlet pressure passage 16 and opens at its inner end into the return chamber 24. There is slidably positioned within the cylinder 48 a shuttle valve 50 having a first port 51 and a second port 52 which are both communicated with a central passage 53 extending longitudinally from the outer end of the shuttle valve. The outer end portion 531 of the passage 53 is of larger diameter than the inner end portion 532, defining therebetween a valve seat 55 for a poppet valve 56 which is slidable in the outer enlarged portion 531 and is urged toward the seat 55 by a helical spring 57 which is compressed between the poppet 56 and the outer end of the valve cylinder 48. The outer end portion of the cylinder 48 is communicated with the shuttle valve port 52 in all positions of the shuttle valve and of the poppet 56 by flutes 561 formed in the outer surface of the poppet 56 and/or by passages 59 in the shuttle valve 50.

A small thermal relief valve 60 is provided between the chamber 41 and the chamber 24 to prevent dangerous pressures developing in the chamber 41 and connected passages due to rise in temperature.

The valve functions as follows:

In neutral position as shown in Fig. 1, the return valves 36 and 36a are closed, and likewise the check valves 44 and 44a are closed. Therefore both of the motor passages 15 and 15a are blocked within the valve, so that the piston of the motor cylinder 11 is locked in position against movement in either direction. Under the condition described both of the shuttle valves 50 and 50a are in neutral position in which the first ports 51 and 51a connect the pressure ports 49 and 49a to the chamber 24 to permit free flow of fluid from the inlet passage 16 to the return passage 17.

Now let it be assumed that the valve 10 is actuated to deliver fluid to the left end of the motor cylinder 11 to move the piston therein to the right. This is accomplished by swinging the control member 27 from neutral position to its right extreme position which may be referred to as a fully open position. This causes the upper end of the arm 25 to open the return valve 36a thereby connecting the motor passage 15a to the chamber 24 and thence to the return passage 17. At the same time, movement of the lower end of the arm 25 to the left shifts the shuttle valve 50 into the leftmost position, and permits the shuttle valve 50a to be moved by the spring 57a into its leftmost position, as shown in Fig. 2. It will be observed that in this position of the shuttle valve 50 the pressure port 49 of the shuttle valve cylinder is disconnected from the chamber 24 and is connected through the shuttle valve first port 51, passage 53, the valve seat 55 and the second port 52 to the motor port 47 and thence past the check valve 44 to the motor passage 15 to deliver fluid to the left end of the motor cylinder 11. The poppet 56 is held off the seat 55 by the flow, thereby producing a pressure drop in the second port 52 relative to the pressure in the inlet passage 16. The reduced pressure in the second port 52 is applied through the passage 59 and through the flutes 561 in the poppet 56 to the left end of the shuttle valve cylinder 48 where it is effective against the shuttle valve to urge it to the right back to neutral position.

However, at this time, the pressure port 49a in the shuttle valve cylinder 48a is connected to the second port 52a of the shuttle valve 50a so that full pressure is applied past the poppet valve 56a and through the passage 59a to the right end of the shuttle valve cylinder 48a where it is effective against the right end of the shuttle valve. Since the pressure effective against the right end of the shuttle valve 50a is greater than that effective against the left end of shuttle valve 50 there is a differential force urging the shuttle valves into left position. This force is sufficient to overcome the force of the spring 57 and the spring 39a which are urging the valve into neutral position. The valve therefore remains in the fully open position until the piston of the motor cylinder 11 reaches the end of its stroke and stops, thereby stopping flow through the motor passage 15 and permitting return of the poppet valve element 56 to its seat. The poppet valve therefore no longer functions as a pressure reducing valve and the pressure rises in the left end of the shuttle valve cylinder 48 as a result of leakage between the shuttle valve cylinder and the shuttle valve. This equalizes the hydraulic forces urging the two shuttle valves 50 and 50a inwardly so that the springs 57 and 39a are effective to restore the valve to neutral position.

If the control member 27 is moved to the left into its other open position, the shuttle valve 50a is moved to the right and the return valve 36 is moved to the left, thereby creating the necessary conditions for the delivery of pressure fluid to the motor port 15a and thence to the right end of motor cylinder 11 and the return of fluid from the left end of the cylinder 11 through the motor port 15 and thence to return.

It will be noted that the springs 57 and 57a associated with the pressure dropping poppets 56 and 56a together with the springs 39 and 39a on the return valves 36 and 36a not only function to control their respective valves but also provide the forces urging the control member 27 into neutral position so that a separate restoring or centering spring is not required. An advantage of the construction is that the hold-open force is independent of the pressure, being a function only of fluid flow.

The hold-open force is also independent of the return flow from the motor cylinder. This is desirable because if the mechanical load on the motor is acting in the same direction as the hydraulic force, the motor piston may move to the end of its stroke faster than fluid is supplied, and stop. When the valve is held open by return flow, this restores the selector valve before the pressure side of the motor is filled with fluid.

The valve will hold open on the power stroke when used with a single acting cylinder. Thus if the load on the piston of motor cylinder 11 is always acting from right to left, the right end of the cylinder can be vented to atmosphere, and the motor line 19, motor port 15a, return valve 36a, check valve 44a and passage 47a can be eliminated. Obviously a valve dependent upon return flow for hold open cannot hold on the power stroke when used with a single acting motor cylinder, because there is no return flow.

The check valves 44 and 44a not only lock the motor cylinder against movement of the motor when the valve is in neutral position, but prevent back flow therefrom when the shuttle valve is first opened. This makes possible the dimensioning and positioning of the ports of the shuttle valves such that port 52 registers with port 49 while the latter is still connected by port 51 to the return chamber 24. When the bypass to return is cut off by opening movement of the shuttle valve, the path to the motor through the check valve 44 is already prepared, and flow to the motor commences as soon as the pressure in passage 16 rises high enough to overcome the motor resistance. It will be noted that since port 51 is cut off from the return chamber 24 before port 52 is cut off from port 49, initial flow to the motor is through the port 52 so that there is no pressure drop across the poppet 56 and no unbalanced force urging the valve open. This is advantageous since it enables the operator to slowly move the motor into a partial stroke position by cracking the valve, without the valve automatically trying to move into fully open position. However, when the operator wants full stroke operation he throws the control member into fully open position and it holds in that position until the motor stroke is completed.

When the valve is only cracked, the speed of the motor is positively controlled, even though the load thereon is urging it in the same direction, by a shoulder 361a on the return poppet 36a, which restricts return flow from the motor in partially open position of the control member 27.

It is to be noted that although the shuttle valve is shown formed in two sections 50 and 50a, these sections always move in unison and function as a single element because they are always urged inwardly against the arm 25 by pressure and/or spring forces in all positions. They could be formed as a single element without changing their operation.

On the other hand, the return poppets 35 and 35a do not move in unison, and by varying the lengths of their inner ends they can be actuated by the arm 25 in desired relation with respect to the shuttle valve.

Although for the purpose of explaining the invention, a particular embodiment thereof has been shown and described, obvious modifications will occur to a person skilled in the art, and I do not desire to be limited to the exact details shown and described.

I claim:

1. A selector valve comprising: a body having an inlet pressure passage, a return passage, and a motor passage; a control member movable between first and second active positions through a neutral position; a normally closed return valve connecting said motor passage to said return passage, and means responsive to movement of said control member into said second active position for opening said return valve; a shuttle valve cylinder in said body and a shuttle valve reciprocable therein; means coupling said shuttle valve to said control member for movement therewith through a neutral position between a first end position corresponding to said first active position of said control member and a second end position corresponding to said second active position of said control member; said shuttle valve cylinder having a pressure port connected to said pressure passage and a motor port connected to said motor passage; said shuttle valve having a first port registering with said pressure port in said first position of said shuttle valve and a second port connected to said first end of said shuttle valve and registering with said motor port in said first position of said shuttle valve; pressure reducing means communicating said first shuttle valve port with said second shuttle valve port whereby during flow from said first port to said second port the pressure at said motor port and said one end of the shuttle valve is less than the inlet passage pressure; means for applying full inlet passage pressure to the second end of said shuttle valve whereby during flow from said inlet passage through said first and second shuttle valve ports to said motor port there is an unbalanced pressure force on said shuttle valve urging it to said one end position; and spring restoring means urging said shuttle valve toward neutral position with a force less than said unbalanced pressure force whereby said shuttle valve is retained in said first end position by differential pressure thereon during flow to said motor port and is restored to neutral position by said spring restoring means when said flow ceases.

2. A valve according to claim 1 in which said pressure reducing means comprises: a longitudinal passage in said shuttle valve extending from said one end thereof and connecting at longitudinally spaced points therein to said first and second ports; a valve element movable in said passage between an outer open position into an inner closed position in which it blocks said passage intermediate said second and first ports; and spring means interposed between said valve element and the first end of said cylinder for urging said element toward closed position.

3. A valve according to claim 2 in which said passage in said shuttle valve defines a poppet valve seat intermediate said first and second ports and said valve element is a poppet adapted to fit against said seat.

4. In a valve according to claim 1: a second motor passage; a second normally closed return valve connecting said second motor passage to said return passage, and means responsive to movement of said control member into said first active position for opening said second return valve; said shuttle valve cylinder having a second pressure port connected to said pressure passage and a second motor port connected to said second motor passage; said shuttle valve having a third port registering with said pressure port in said second end position of said shuttle valve and a fourth port connected to the second end of the shuttle valve and registering with said second motor port in said second position of said shuttle valve; second pressure reducing means communicating said third shuttle valve port with said fourth shuttle valve port whereby during flow from said third port to said fourth port the pressure at said second motor port and said second end of said shuttle valve is less than the inlet passage pressure, said fourth port registering with said second pressure port and constituting said means for applying full inlet pressure to the second end of the shuttle valve in said first position of the shuttle valve.

5. A valve according to claim 4 in which said return valves are check valves having springs closing them in neutral position of said control member, the check valve springs constituting at least a part of said spring restoring means urging said shuttle valve toward closed position.

6. A valve according to claim 4 in which said second pressure reducing means comprises a second longitudinal passage in said shuttle valve extending from said second end thereof and connecting at longitudinally spaced points therein to said third and fourth ports; a second valve element movable in said second passage between an outer open position into an inner closed position in which it blocks said second passage intermediate said third and fourth ports; and spring means interposed between said second valve element and the second end of said cylinder for urging said second element toward closed position; said two spring means at opposite ends of said shuttle valve constituting at least a part of said spring restoring means urging said shuttle valve toward closed position.

7. A valve according to claim 4 including a check valve between each shuttle valve cylinder motor port and its associated motor passage for permitting flow from the motor port to the passage and preventing return flow.

8. A valve according to claim 1 in which said shuttle valve cylinder has a return port connected with said first port in said neutral position and disconnected from said first port in said first active position; and said second port is dimensioned to lap both said pressure and motor ports in the position of said shuttle valve in which it disconnects said first port from said return port, whereby said shuttle valve connects the pressure port directly to the motor port in shunt to the pressure-reducing valve as flow from said first port to the return port is cut off.

9. A valve according to claim 8 including: a second motor passage; a second normally closed return valve connecting said second motor passage to said return passage; and means responsive to movement of said control member from neutral to said first active position for opening said second return valve in such phase relation to said shuttle valve that said second return valve restricts flow therethrough to a greater extent than said shuttle valve restricts flow from said pressure port to said second port as said first port cuts off from said return port.

ALVIN A. MEDDOCK.

No references cited.